United States Patent [19]

Brieskorn

[11] Patent Number: 5,793,860
[45] Date of Patent: Aug. 11, 1998

[54] METHOD AND ARRANGEMENT FOR CONTROLLING PERFORMANCE FEATURES OF AN EXCHANGE

[75] Inventor: Juergen Brieskorn, Geltendorf, Germany

[73] Assignee: Siemens Aktiengesellschaft, Munich, Germany

[21] Appl. No.: 673,291

[22] Filed: Jun. 28, 1996

[30] Foreign Application Priority Data

Jun. 28, 1995 [DE] Germany .................. 195 23 537.1

[51] Int. Cl.$^6$ .................................................. H04M 3/42
[52] U.S. Cl. ............................................ 379/229; 379/201
[58] Field of Search ................................ 379/201, 207, 379/230, 229, 231, 142, 157, 219, 220, 221, 247; 370/259, 270

[56] References Cited

U.S. PATENT DOCUMENTS

| | | | |
|---|---|---|---|
| 4,928,306 | 5/1990 | Biswas et al. | 379/201 |
| 5,289,535 | 2/1994 | Bogart et al. | 379/201 |
| 5,509,123 | 4/1996 | Dobbins et al. | 370/389 |

*Primary Examiner*—Krista Zele
*Assistant Examiner*—Scott Wolinsky
*Attorney, Agent, or Firm*—Hill & Simpson

[57] ABSTRACT

The method is for controlling performance features of an exchange. In step a) a static table of performance feature object codes, having corresponding code values, is transmitted from the exchange to a terminal equipment during an equipment initialization. The static table of performance feature object codes is specific for the exchange and contains all performance features available in the exchange. Information for the specification of the performance feature object is allocated to each performance feature object code value. In step b) the static table of performance feature object codes is stored in the terminal equipment. In step c) a dynamic table of performance feature object codes, which correspond to the performance features that can be activated in the respectively current switching-oriented state of the terminal equipment, is transmitted from the exchange to the terminal equipment. In step d) the performance features of the current switching-oriented state are displayed by the terminal equipment, according to the dynamic table of performance feature object codes. In step e) the desired performance feature is selected in the terminal equipment. In step f) the selected performance feature is acknowledged through transmission of the corresponding performance feature object code value from the terminal equipment to the exchange. In step g) the switching-oriented state corresponding to the selected performance feature is altered, and then a return is made to step c).

13 Claims, 2 Drawing Sheets

METHOD AND ARRANGEMENT FOR CONTROLLING PERFORMANCE FEATURES OF AN EXCHANGE

BACKGROUND OF THE INVENTION

The present invention relates to a method and arrangement for controlling performance features of an exchange.

For switching systems that use a stimulus protocol such as, for example, the protocol CorNet-TS of the company Siemens AG, no mechanisms that permit an abstract, that is, an object-oriented controlling of performance features, are currently defined. An example of an abstract controlling of performance features, what is known as the "feature key management" of the protocol CorNet-T, also by the company Siemens AG, can be named, which uses the messages "Feature presentation," "Feature activation" and "Feature indication." This protocol is based on protocol architectures that are standardized in CCITT Q.931/932. However, known mechanisms for the abstract controlling of performance features cannot be taken over given a stimulus protocol, due to the different protocol architecture.

SUMMARY OF THE INVENTION

It is an object of the present invention to provide a method and an arrangement for the abstract controlling of performance features in switching systems that use a stimulus protocol, in order to enable the connection of terminal equipment with an efficient supporting of the performance features of the exchange.

In general terms the present invention is a method for controlling performance features of an exchange.

A static table of performance feature object codes, having corresponding code values, is transmitted from the exchange to a terminal equipment during an equipment initialization. The static table of performance feature object codes is specific for the exchange and contains all performance features available in the exchange. Information for the specification of the performance feature object is allocated to each performance feature object code value. The static table of performance feature object codes is stored in the terminal equipment. A dynamic table of performance feature object codes, which correspond to the performance features that can be activated in the respectively current switching-oriented state of the terminal equipment, is transmitted from the exchange to the terminal equipment.

The performance features of the current switching-oriented state are displayed by the terminal equipment, according to the dynamic table of performance feature object codes. The desired performance feature in the terminal equipment is selected. The selected performance feature is acknowledged through transmission of the corresponding performance feature object code value from the terminal equipment to the exchange. The switching-oriented state corresponding to the selected performance feature is altered, and a return is made to the step of transmitting the dynamic table.

Advantageous developments of the present invention are as follows.

The information for the description of the performance feature object is a character string allocated to the performance feature object code value.

The information for the description of the performance feature object is a mnemonic transcription of a performance feature, allocated to the performance feature object code value.

The transmission of the dynamic table of performance feature object codes from the exchange to the terminal equipment takes place through transmission of the performance feature object code values allocated to the performance features.

The display of the performance features by the terminal equipment ensues in dependence on its user interface.

The terminal equipment preselects at least one performance feature from the dynamic table of performance feature object codes and displays the at least one preselected performance feature.

An additional transmission of performance feature object codes is carried out for the processing of applications with temporally variant performance features according to the first step of the method, during which transmission an allocation that is specific for the application or for a subscriber is made between a performance feature object code value and a performance feature object.

The additional transmission is recurrently carried out in the manner of an overwriting, in dependence on the application.

The additional transmission does not affect the static table of performance feature object codes transmitted in the first step of the method.

The present invention is also an arrangement for carrying out the above described method. The arrangement has a terminal equipment with a display apparatus, a control apparatus, a memory with random access and a non-volatile memory, and an exchange with a control apparatus. The terminal equipment is connected with the exchange via a bidirectional data line.

Advantageous developments of the present invention are as follows.

In place of the exchange, a server is connected with the terminal equipment.

The exchange has a control apparatus for carrying out a program corresponding to the above-described method.

The terminal equipment also has a control apparatus for carrying out a program corresponding to the above-described method.

The inventive method and the arrangement have the advantage that the overall processing of performance features is controlled from the exchange. The controlled terminal equipment requires no switching-oriented state awareness, but applications located in the terminal equipment can access the performance features of the exchange in a quasi-functional manner, by means of the object-oriented coding of the performance features. The functional partitioning of the stimulus protocol is thereby maintained. A static table of performance features or, respectively, corresponding performance feature object codes, which are specific for the exchange and not for the connected terminal equipment, to which equipment different performance features are allocated if warranted, is downloaded during the initialization, and dynamic tables of performance features corresponding to the switching-oriented state of the terminal equipment of the system are inventively transmitted. This offers the advantage that transmission times for performance feature code values are reduced, and connection lines between the exchange and terminal equipment are thereby relieved of strain. At the same time, the exchange and terminal equipment can be easily constructed, from a switching-oriented and program-oriented point of view.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

The present invention is now to be explained by means of an example of a terminal equipment of the type Symphony M2 of the company Siemens AG. The Symphony M2 terminal equipment is a terminal equipment having a proprietary protocol and a stimulus function distribution. The terminal equipment has a microprocessor, a memory having random access (RAM), a non-volatile memory and a display apparatus. The features of the display are as follows:

row-oriented, with n×24 rows, whereby n>2;

no graphic icons that are controlled directly by a bitmap representation, performance feature codes that are used for performance feature display and activation, support of a performance feature object code (FOC), that is, allocation of a character string to a performance feature object code or, respectively, assignment of a graphic performance feature object (icon), which represents the performance feature, to a performance feature object code.

The performance feature control according to the present invention can be described as an object-oriented metalanguage for performance feature activation/display and for performance feature representation. The control of the performance features thereby ensues by means of performance feature object codes FOC. The functional partitioning of the terminal equipment is of the type of a stimulus protocol. The terminal equipment is an input/output apparatus having an intelligence that serves only for the local representation of performance features. The control of the switching-oriented states and the control of the possible performance features takes place entirely at the side of the exchange. No character attributes such as, for example, bold, blinking or underlined are allocated to character-oriented performance feature objects (IA5 character strings). The character representation of the performance feature objects is a purely local task of the terminal equipment. Graphically oriented performance feature objects ("icons") are designated by a mnemonic performance feature description (for example. "CALL_REDIRECTION_ACTIVATION"). The graphic representation of the performance feature objects is also a local task of the terminal equipment.

Figure 1:
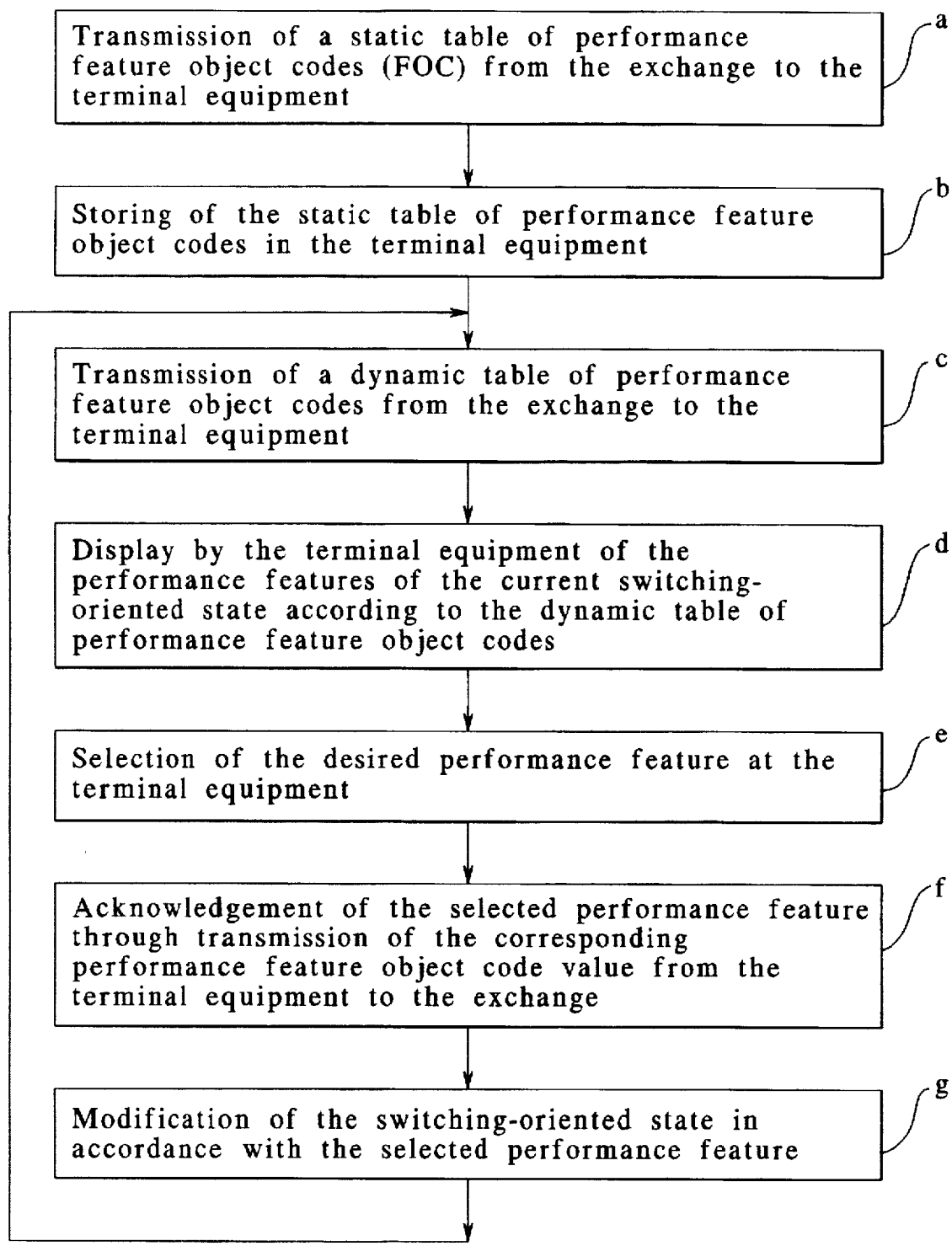
FIG. 1 is a flow chart of a preferred exemplary embodiment of the method of the present invention.

According to the method of the present invention, as shown in a preferred exemplary embodiment in the flow diagram of FIG. 1, in a first step a) a static table of performance feature object codes FOC is transmitted during the equipment initialization by the exchange, for example, a private branch exchange, to all connected terminal equipment independent of which performance features are allocated to them. This static table of performance feature object codes is specific for the exchange and contains all the performance features available in the system. During this transmission, an information for the description of the performance feature object is allocated to each performance feature object code value. That is, in dependence on the type of terminal equipment and/or the application, for example an IA5 character string (FOC#→"IA5-string") or a mnemonic performance feature description (FOC#→"mnemonic performance feature description") is allocated to a performance feature object code value FOC. For the processing of applications with temporally variant object contents, that is, in order, for example, to support the performance features of a server that controls the terminal equipment in place of an exchange, an additional transmission of performance feature object codes can be provided in which for example, an allocation specific for the application or for a subscriber is made between a performance feature object code value and a performance feature object. Depending on the application, this additional transmission can take place recurrently in the manner of an overwriting, whereby the base transmission, specific for the exchange, of the static table is not affected.

In each case the exchange ensures the unambiguous allocation of the performance feature object code and of the performance feature object. The terminal station thus knows the transmitted base information from the exchange, and the exchange must carry out a possible updating of this base information.

After the equipment initialization and the transmission of the static table of performance feature object codes into the terminal equipment that thereby ensues, the further control of the performance features is carried out by the performance feature object code values.

The terminal equipment is able to store the information transmitted by the exchange in a non-volatile memory (RAM), in a second step b) (see FIG. 1).

In a third step c), what is known as a dynamic table of performance feature object codes is transmitted by the exchange to the terminal equipment. The performance feature object codes of this dynamic table correspond to the performance features that can be activated in the respectively current switching-oriented state of the terminal equipment.

In a further step d), the terminal equipment then displays the possible performance features as a local task on the basis of the dynamic performance feature table. The type of representation thereby depends on the user interface (character-oriented, graphic), and is decoupled from the protocol as far as possible through the use of the performance feature object code values. A use of both methods is also possible. As long as the terminal equipment user has not yet definitively selected a desired performance feature, the selection process is handled locally in the terminal equipment (for example, through the scrolling of the performance feature description). This selection process in the terminal equipment before the definitive selection by the user is a preselection according to predefined criteria. The preselection of one or several performance features can be probability-related, and enables a faster selection by the user, who then has only to confirm this preselection, for example, by actuating a separate key. The selection process takes place completely independently of the exchange only under the control of the corresponding intelligent terminal equipment. The display of the selected performance feature (s) on the display apparatus, in particular a display screen, can take place for example through the inversion of the character strings that describe the performance feature. The selection by the user can also take place for example, through the use of a mouse.

If a performance feature is selected (fifth step e)), only the associated performance feature object code value is transmitted to the exchange (sixth step f)). The desired performance feature is activated on the basis of this performance feature object code value, and the new dynamic table of performance features corresponding to this new switching-oriented state is formed by the exchange and transmitted to the terminal equipment (seventh step g)). The performance features are now again displayed by the terminal equipment, that is, in other words the steps of the method are repeated at every alteration of the switching-oriented state, based on the third step c), until the connection between the terminal equipment and the exchange is ended. The method according to the present invention is thus carried out by the exchange in cooperation with the terminal equipment.

Figure 2:
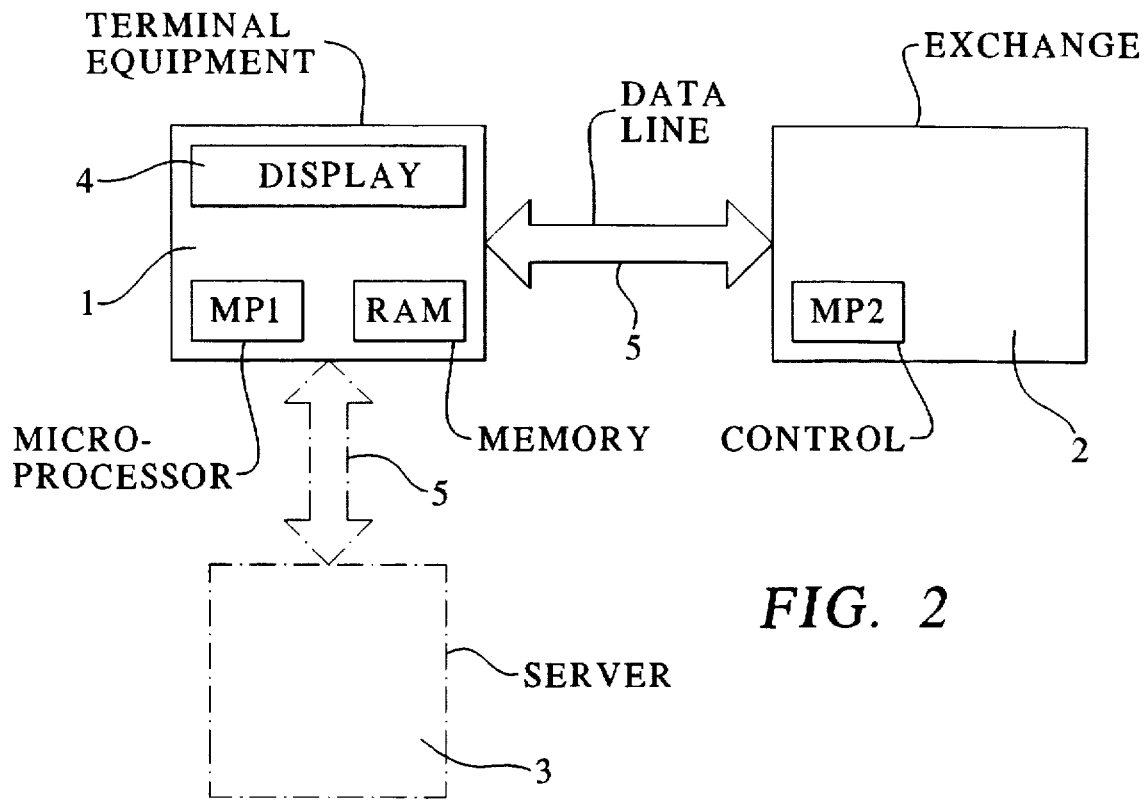
FIG. 2 is a block diagram according to a preferred exemplary embodiment of the arrangement of the present invention.

FIG. 2 shows a block diagram of a preferred exemplary embodiment of an arrangement for carrying out the method of the present invention.

For the bidirectional exchange of data, a terminal equipment 1 is connected with an exchange 2 via a data line 5. The terminal equipment 1 comprises a control means, in particular a microprocessor MP1 that carries out the inventive method in cooperation with a control means MP2 of the exchange 2, a memory RAM with random access, a non-volatile memory (not shown) and a display apparatus 4. The display apparatus preferably corresponds to a terminal equipment of the type Symphony M2 of the company Siemens AG, as described above. However, any suitable apparatus capable of display, such as for example, a picturephone, a computer display screen or the like can be used as terminal equipment. It is in particular also possible to use a server 3 (shown in broken lines in FIG. 2) in place of the exchange 4. By this means, the method of the present invention can also be used for multimedia applications.

In the following, a preferred exemplary embodiment of the construction of a display of a terminal equipment according to the present invention is described on the basis of FIG. 3. The character-oriented display of a terminal equipment is thereby divided into two parts, on the one hand a window controlled directly by the exchange (M window) and on the other hand a window for the display of the respectively current performance features according to the present invention (N window). Terminal equipment having a graphic display also support the M window controlled by the exchange. The representation of the N window controlled by the performance feature object code is completely subject to the control of the local terminal equipment. The addressing of the M window controlled by the exchange ensues according to the usual standardized display protocol. The N window of the display protocol according to the present invention is performance-feature-oriented, that is, it contains all currently possible performance features according to the dynamic table of performance feature object codes, which is newly transmitted at each switching-oriented state transition.

The transmission of the static table of performance feature object codes permits the allocation of an IA5 character string and/or of a mnemonic performance feature description to a performance feature object code value, as described above. The graphic or non-character-oriented display can respectively use one or also both of these allocations.

The static table of performance feature object codes for a graphic display can thus be as follows, according to a preferred exemplary embodiment of the present invention:

FOC#1: "1st mnemonic performance feature description"
FOC#2: "2nd mnemonic performance feature description"
●
●
FOC#n: "nth mnemonic performance feature description"
●
●
FOC#N: "Nth mnemonic performance feature description"

whereby $N_{max}=2^{16}$, assuming a 16-bit coding.

The representation of the performance feature objects is thereby a purely local task of the terminal equipment.

Figure 3:
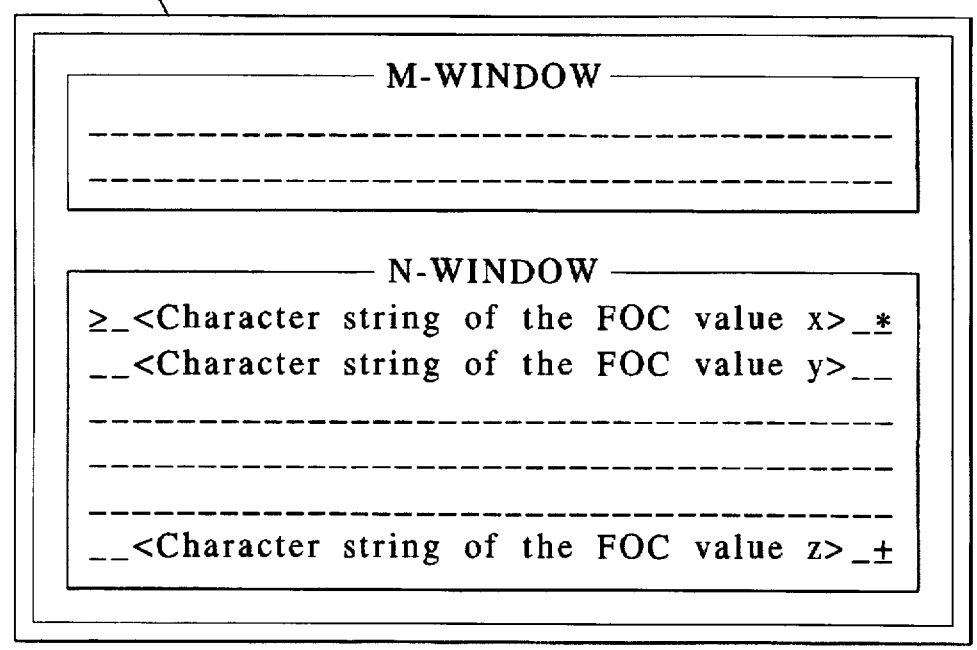
FIG. 3 depicts a preferred exemplary embodiment of a character-oriented display according to the method of the invention.

FIG. 3 shows a preferred exemplary embodiment of a character-oriented display according to the present invention. The N window for the display protocol according to the present invention is performance feature-oriented. The possible performance features corresponding to the dynamic table of performance feature object codes are transmitted to the terminal equipment at each switching-oriented state transition. The M window is structured according to rows and columns, and the terminal equipment contains an information from the exchange defining the number m of rows that are to be displayed in the M window. The N window is then arranged in the next row under the M window, beginning with the first column. The static table of performance feature object codes, which are transmitted during the equipment initialization and are specific for the exchange, can be for example as follows:

FOC#1: "IA5 character string #1"
FOC#2: "IA5 character string #2"
●
●
FOC#n: "IA5 character string #n"
●
●
FOC#N: "IA5 character string #N"

whereby $N_{max}=2^{16}$, assuming a 16-bit coding.

Afterwards, the dynamic table of performance feature object codes corresponding to the respective performance features that can be activated in the current switching-oriented state is transmitted, whereby the display of the performance features is a local task of the terminal station and is handled through the local control apparatus MP1. The access of the exchange to the M window controlled by it takes place according to the usual standardized display protocol. The content of the N window corresponds to the performance features transmitted with the dynamic table of performance feature object codes. The first entry in the displayed list begins in row m+1 of the display. It corresponds to the first performance feature description. The further performance feature descriptions then follow, respectively displaced by one row in the sequence of their ordering in the dynamic table of performance feature object codes. The length of the character strings is limited to 22 characters in the present example, so that the terminal equipment can for example indicate the beginning of the list (by "*" in FIG. 3), or can also indicate that more entries are present (by "+" in FIG. 3), if the dynamic table contains more entries than there are available rows in the N window. These markings can be defined during transmission, in the equipment initialization. The N window thus displays a menu of performance features that respectively corresponds to the switching-oriented state of the terminal equipment. If there are more performance features in the dynamic table of performance feature object codes than available rows in the N window, the terminal equipment scrolls the list in the N window. After the selection of a performance feature in the menu, this is reported by the terminal equipment, through the transmission of the corresponding performance feature object code value to the exchange.

The exchange can write into the N window via the standard display protocol using the row-column addressing method. These character strings written by means of the exchange are not manipulated by the local scrolling of the terminal equipment, and the character string written by the exchange is overwritten in the next local access to the N window by the terminal equipment.

Depending on the size of the menus that depend on the switching-oriented state, or of the service-related menus, the exchange can indicate how many rows m are to be used for the M window controlled by the exchange. Moreover, it can indicate whether or not a dividing line is to be displayed between the windows. The division between the M and N windows is a local task of the terminal equipment. The dividing line is constructed for example, through a sequence of identical characters that are defined in the equipment initialization. The terminal equipment then knows the remaining size of the N window. The generation of the display of the selected row is also the task of the terminal equipment. This display can take place, for example, through the inverting of the selected row or through the insertion of a pointer. All rows of the N window are controlled by the terminal equipment, whereby the first row in the N window, corresponding to the first performance feature object code value in the dynamic table and thus to the first selectable performance feature, is displayed directly after the reception of a new dynamic table of performance feature object codes as locally selected by the terminal equipment.

If the list to be displayed has fewer entries than there are available rows in the N window, the terminal equipment does not carry out a scrolling, but rather moves the pointer to the displayed menu page. If the list to be displayed has more entries than there are rows in the N window, the terminal equipment scrolls the list row by row on the display, whereby respectively the last row is displayed as selected.

The preceding described representation of the performance features on the display by means of a partitioning of the display into two windows is to be understood purely as an example, and any suitable representation on a display can be supported by the method of the present invention.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for controlling performance features of an exchange, comprising the steps:
   a) transmitting a static table of performance feature object codes, having corresponding code values, from an exchange to a terminal equipment during an equipment initialization, the static table of performance feature object codes being specific for the exchange and containing all performance features available in the exchange, and information for the specification of the performance feature object being allocated to each performance feature object code value;
   b) storing the static table of performance feature object codes in the terminal equipment;
   c) transmitting a dynamic table of performance feature object codes, which correspond to the performance features that are activatable in a respectively current switching-oriented state of the terminal equipment, from the exchange to the terminal equipment;
   d) displaying the performance features of the current switching-oriented state of the terminal equipment, according to the dynamic table of performance feature object codes;
   e) selecting a desired performance feature in the terminal equipment;
   f) acknowledging the selected performance feature through transmission of a performance feature object code value corresponding to the selected performance feature from the terminal equipment to the exchange; and
   g) altering the switching-oriented state corresponding to the selected performance feature, and returning to step c).

2. The method according to claim 1, wherein the information for the specification of the performance feature object is a character string allocated to the performance feature object code value.

3. The method according to claim 1, wherein the information for the specification of the performance feature object is a mnemonic transcription of a performance feature, allocated to the performance feature object code value.

4. The method according to claim 1, wherein the transmission of the dynamic table of performance feature object codes from the exchange to the terminal equipment takes place through transmission of the performance feature object code values allocated to the performance features.

5. The method according to claim 1, wherein the display of the performance features by the terminal equipment ensues in dependence on a user interface thereof.

6. The method according to claim 1, wherein the terminal equipment preselects at least one performance feature from the dynamic table of performance feature object codes and displays the at least one preselected performance feature.

7. The method according to claim 1, wherein an additional transmission of performance feature object codes is carried out for processing of applications with temporally variant performance features according to step a), during which transmission an allocation, that is specific for an application or for a subscriber, is made between a performance feature object code value and a performance feature object.

8. The method according to claim 7, wherein the additional transmission is recurrently carried out in the manner of an overwriting, in dependence on the application.

9. The method according to claim 7, wherein the additional transmission does not affect the static table of performance feature object codes transmitted in step a).

10. An arrangement for controlling performance features of an exchange, comprising:
   at least one terminal equipment having a control apparatus connected to a display apparatus and to a random access non-volatile memory;
   an exchange having a control apparatus;
   a bidirectional data line connecting the terminal equipment with the exchange;
   wherein in a first step a static table of performance feature object codes, having corresponding code values, is transmitted from the exchange to the terminal equipment during an equipment initialization, the static table of performance feature object codes being specific for the exchange and containing all performance features available in the exchange, and information for the specification of the performance feature object being allocated to each performance feature object code value;
   wherein in a second step the static table of performance feature object codes is stored in the memory in the terminal equipment;
   wherein in a third step a dynamic table of performance feature object codes, which correspond to the performance features that can be activated in a respectively current switching-oriented state of the terminal equipment, is transmitted from the exchange to the terminal equipment;

wherein in a fourth step the performance features of the current switching-oriented state are displayed on the display apparatus of the terminal equipment, according to the dynamic table of performance feature object codes;

wherein in a fifth step a desired performance feature is selected in the terminal equipment; and wherein in a sixth step the selected performance feature is acknowledged through transmission of a performance feature object code value corresponding to the selected performance feature from the terminal equipment to the exchange.

11. The arrangement according to claim 10, wherein the control apparatus of the exchange has a program that executes at least the first through sixth steps.

12. The arrangement according to claim 10, wherein the control apparatus of the terminal equipment has a program that executes at least the first through sixth steps.

13. The arrangement according to claim 10, wherein a server is connected with the terminal equipment in place of the exchange.

* * * * *